United States Patent [19]
Takahashi

[11] Patent Number: 6,109,703
[45] Date of Patent: Aug. 29, 2000

[54] VEHICLE BRAKE CONTROL SYSTEM WITH INTELLIGENT BRAKING FUNCTIONS

[75] Inventor: Kimio Takahashi, Saitama, Japan

[73] Assignee: Akebono Brake Industry Co., Ltd., Tokyo, Japan

[21] Appl. No.: 09/189,799

[22] Filed: Nov. 12, 1998

[30] Foreign Application Priority Data

Nov. 11, 1997 [JP] Japan ................................ 9-308826
Feb. 16, 1998 [JP] Japan ............................... 10-033151

[51] Int. Cl.[7] ........................................................ B60T 8/32
[52] U.S. Cl. .................................... 303/155; 303/113.4
[58] Field of Search ................................ 303/3, 15, 20, 303/155, 113.4; 188/DIG. 1

[56] References Cited

U.S. PATENT DOCUMENTS

| | | | |
|---|---|---|---|
| 5,294,191 | 3/1994 | Giorgetti et al. | 303/3 |
| 5,584,542 | 12/1996 | Klaber et al. | 303/155 |
| 5,727,854 | 3/1998 | Pueschel et al. | 303/155 |
| 5,951,121 | 9/1999 | Takahashi | 303/155 |

*Primary Examiner*—Matthew C. Graham
*Attorney, Agent, or Firm*—Morgan, Lewis & Bockius LLP

[57] ABSTRACT

A control unit, which causes brake units to generate braking force corresponding to a braking operation by controlling the operation of electric actuators, compares the pressure difference detected by first and second pressure sensor with a threshold value. When the pressure difference exceeds the threshold value, the control unit switches a control mode to a sudden braking mode, compares the sudden braking mode with a normal braking mode which the pressure difference does not exceed the threshold value, and controls supply of electric power to the electric actuators causing the braking force generated by the respective brake units to be increased.

3 Claims, 10 Drawing Sheets

VEHICLE BRAKE CONTROL SYSTEM WITH INTELLIGENT BRAKING FUNCTIONS

BACKGROUND OF THE INVENTION

The present invention relates to a vehicle brake control system capable of producing a suitable brake operating feeling, causing electrically-driven brake units to be simultaneously actuated with excellent responsivity by detecting a brake operating condition accurately and quickly, generating sufficient and necessary braking force making up for insufficiency of brake operating force when it is needed to brake suddenly and furthermore securing the proper operation of the brake units even at the time of an electric system failure.

Intelligent braking functions have been introduced positively into recent vehicle brake equipment to install antilock brake systems and traction control systems and in order to deal with intelligent systems, the development of electric brake equipment is in progress.

In the case of such electric brake equipment, it marks a very important point whether the brake equipment is operated as a driver demands because the performance of a brake-operation detecting unit for allowing the driver to precisely detect a brake-pedal operating condition and the performance of a control unit for controlling the braking force of brake units by operating electric actuators according to a signal from the brake-operation detecting unit greatly affect the braking performance.

A conventional brake-operation detecting unit has been developed as shown in FIG. 10, for example, which is equipped, in the stepping-on portion 1a of a brake pedal 1 of a vehicle, with a stepping-on force sensor 2 for detecting the force of stepping on the brake pedal 1 by a driver.

A predetermined operational counterforce (a brake operating feeling) is normally obtained from the aforesaid brake pedal 1 itself when the driver steps on the brake pedal 1, which is resiliently supported by a pedal urging spring 3, so that the brake pedal 1 is restored to the initial position quickly when the driver releases his leg from the brake pedal 1.

The aforesaid stepping-on force sensor 2 is what outputs an electric signal in response to the stepping-on force applied by the driver. The stepping-on force applied by the driver to the stepping-on force sensor 2 sharply increases as shown by a curve A of FIG. 11 at the time of braking suddenly including braking in a panic, whereas it slowly increases as shown by a curve B thereof at the time of braking slowly including braking normally.

Therefore, as shown in FIG. 12, the electric signal outputted from the stepping-on force sensor 2 is differentiated to obtain an increasing rate of the stepping-on force (inclinations of the curves A, B shown in FIG. 11) in order to distinguish between suddenly braking and gradually braking. It is thus possible to realize the braking operation that the driver demands by controlling the operation of the brake units in accordance with the results thus distinguished.

Incidentally, a curve C in FIG. 12 corresponds to the curve A at the time of braking suddenly in FIG. 11, whereas a curve D in FIG. 12 corresponds to the curve B at the time of braking gradually in FIG. 11.

There has also been proposed a control unit for controlling the braking force outputted from the brake unit such that supply of electric power to the electric actuator is controlled according to the output signal of the stepping-on force sensor 2 so as to obtain braking force proportional to the intensity of the stepping-on force detected by the stepping-on force sensor 2.

As shown by the curve A of FIG. 11, noise n having a minute amplitude is carried on the stepping-on force sensor at the time of braking suddenly and when the output signal of the stepping-on force sensor 2 is differentiated, the noise n is amplified and the amplified noise n affects the stepping-on force as shown in FIG. 12. Consequently, it is feared that a wrong decision would be made on the operating condition of the brake pedal 1 (e.g., whether or not the sudden brake is applied?) because of the noise n.

When a filtering process is carried out to remove the noise n in order to avoid such inconvenience, there also develops a problem of reducing the response speed because the time required for the filtering process increases a time lag in the braking operation, though a right decision may be made on the operating condition of the brake pedal 1.

When braking force proportional to the stepping-on force detected by the stepping-on force sensor 2 is obtained by controlling the operation of the electric actuator in the case of a female driver having weak stepping-on strength, for example, the value of the stepping-on force detected by the stepping-on force sensor 2 at the time of braking suddenly is small, which may result in posing a serious problem because necessary and sufficient braking force is unavailable.

In some of the conventional electric brakes, for example, disc brakes, a driving unit is simply electrically-driven, that is, an electric motor is employed for moving back and forth a piston for pressing brake pads against a disc and the problem in this case is that the braking operation is hardly securable at the time of an electric system failure.

SUMMARY OF THE INVENTION

An object of the present invention made in view of the foregoing problems is to provide a vehicle brake control system capable of producing a suitable brake operating feeling, causing electrically-driven brake units to be simultaneously actuated with excellent responsivity by detecting a brake operating condition accurately and quickly, generating sufficient and necessary braking force making up for insufficiency of brake operating force when it is needed to brake suddenly.

Another object of the present invention is to provide a vehicle brake control system capable of securing the proper operation of brake units even at the time of an electric system failure.

In order to accomplish the object above, a vehicle brake control system according to the present invention comprises: a master cylinder for generating fluid pressure in response to a braking operation, brake units respectively actuated by electric actuators, a brake-operation detecting unit for detecting a brake operating condition from the fluid pressure outputted from the master cylinder and outputting a signal corresponding to the brake operating condition, and a control unit for controlling the braking force outputted from each brake unit by actuating the electric actuator according to the output signal of the brake-operation detecting unit, the brake-operation detecting unit having an input chamber into which the fluid pressure in the master cylinder is introduced, a volumetric variable chamber communicating with the input chamber via an orifice, a piston sliding in the volumetric variable chamber, a spring for urging the piston in the direction of reducing the volume of the volumetric variable chamber, a first and a second pressure sensor for respectively detecting the fluid pressure in the input chamber and the fluid pressure in the volumetric variable chamber, and the control unit being used for switching between control modes according to a pressure difference between the input chamber and the volumetric variable chamber as calculated on the basis of the output signals of the first and second pressure sensors, switching the control mode to a sudden braking mode when the pressure difference exceeds a predetermined threshold value so as to compare the sudden braking mode with the control mode at the time the fluid pressure does not exceed the threshold value, and controlling supply of electric power to each electric actuator so that the braking force generated by the brake unit is increased.

With the arrangement above, the brake-operation detecting unit causes the fluid pressure outputted from the master cylinder in response to the braking operation to be accepted and absorbed by the input chamber and the volumetric variable chamber and simultaneously transmits proper counterforce to the brake pedal as a brake operating means by making use of the urging force of the spring for urging the piston in the volumetric variable chamber.

Furthermore, the brake-operation detecting unit allows the fluid in the input chamber to be slowly pressurized by introducing the fluid pressure in the master cylinder at the time of braking slowly wherein the braking operation is performed slowly in a slow or normal braking mode. Then the fluid thus pressurized in the input chamber flows into the volumetric variable chamber via the orifice and the fluid pressure in the input chamber becomes substantially equal to the fluid pressure in the volumetric variable chamber. The fluid pressure in these input chamber and the volumetric variable chamber fluctuates in accordance with the fluid pressure generated by the master cylinder in response to the braking operation and is usable as a parameter accurately reflecting the degree of the braking operation. Thus, the pressure difference between the input chamber and the volumetric variable chamber at the time of braking slowly shows a substantially constant curve from the initial stage up to the final stage of the braking operation.

At the time of braking suddenly wherein the braking operation is performed suddenly in a sudden or panic braking mode, on the other hand, the introduction of the fluid pressure in the master cylinder causes the fluid in the input chamber to be rapidly pressurized, thus resulting in delaying the passage of the fluid in the input chamber through the orifice. While the fluid pressure sharply rises in the input chamber from the initial stage of the braking operation, the rising of the fluid pressure in the volumetric variable chamber at the initial stage of the braking operation is delayed under the influence of the orifice. Consequently, the pressure difference between the input chamber and the volumetric variable chamber at the time of braking suddenly has a bulging portion sharply rising at the initial stage of the braking operation and shows a substantially constant characteristic curve at the final stage.

The tendency like this invariably appears even a female driver having weak stepping-on strength applies the brakes. Furthermore, whether or not the aforesaid the pressure difference has the bulging portion sharply rising at the initial stage at which the braking operation is started can precisely be determined by setting a suitable threshold value beforehand and comparing the sizes to see whether the pressure difference exceeds the threshold value. Moreover, the process of calculating the fluid pressure difference and comparing the sizes of the fluid pressure difference and the threshold value is not accompanied with any differentiating process but only with additions and subtractions and noise posing a problem in the prior art is never amplified.

The control unit also controls supply of electric power to the electric actuator in accordance with the brake operating condition thus detected, whereby the electrically-driven brake unit can be actuated with proper excellent responsivity as a driver demands.

More specifically, the control unit switches the control mode to the sudden braking mode when the pressure difference exceeding the threshold value is detected and controls supply of electric power to the electric actuator so as to obtain braking force greater than what is provided at the time of braking slowly. Thus, necessary braking force in the sudden braking mode can properly be generated while insufficiency of brake operating force even in the case of a female driver having weak pedal stepping-on strength.

On the other hand, it is preferred that the control unit switches the control mode to the normal braking mode when the pressure difference does not exceed the threshold value and controls supply of electric power to the electric actuator on the basis of the fluid pressure in the first pressure sensor and that in the second pressure sensor so that the braking force generated in the brake unit becomes equal to a value corresponding to the fluid pressure introduced from the master cylinder into the brake-operation detecting unit.

In other words, the values detected by the first and second pressure sensors are substantially equal to each other at the time of braking slowly and either of the values varies with the fluid pressure generated by the master cylinder in response to the braking operation, thus forming a parameter accurately representing the intensity of the brake operating force.

Consequently, proper braking force corresponding to the brake operating force can be generated as in the case of directly actuating the brake unit with the fluid pressure outputted from the master cylinder by controlling supply of electric power to the electric actuator on the basis of the fluid pressure detected by either first or second pressure sensor as aforesaid.

A vehicle brake control system in another aspect of the invention is equipped with an electromagnetic valves for sensors, the electromagnetic valves for the sensors being used for respectively opening and closing hydraulic passages for use in introducing the hydraulic pressure outputted from the master cylinder, and electromagnetic valves for driving portions, the electromagnetic valves for the driving portions being used for respectively opening and closing hydraulic passages hydraulic passages for use in introducing the hydraulic pressure outputted from the master cylinder, and a control unit for controlling the operation of the brake units, the electromagnetic valves for the sensors and the electromagnetic valves for the driving portions, With the arrangement above, the control unit keeps the electromagnetic valve for the driving portion closed and also keeps the electromagnetic valve for the sensor open while the electric system is normal and causes the hydraulic pressure generated by the master cylinder to be accepted by the brake-operation detecting unit and controls the operation of the electric actuator of the brake unit according to the signal outputted from the brake-operation detecting unit, whereby to make the brake unit perform the predetermined braking operation.

In this case, the brake-operation detecting unit causes the fluid pressure outputted from the master cylinder to be accepted and absorbed by the input chamber and the volumetric variable chamber and simultaneously transmits proper counterforce to the brake pedal as a brake operating means by making use of the urging force of the spring for urging the piston in the volumetric variable chamber.

In the brake-operation detecting unit, moreover, the pressurized fluid in the input chamber flows into the volumetric variable chamber via the orifice since the fluid is slowly pressurized in the input chamber because of the introduction of the fluid pressure in the master cylinder at the time of braking slowly wherein the brake pedal is slowly stepped on and not so much pressure difference is produced between the input chamber and the volumetric variable chamber.

At the time of braking suddenly wherein the brake pedal is stepped on suddenly, on the other hand, the passage of the orifice is delayed since the fluid in the input chamber is suddenly pressurized because of the introduction of the fluid pressure in the master cylinder and the fluid pressure in the volumetric variable chamber slightly rises, whereas the fluid pressure in the input chamber rises greatly, thus resulting in producing great pressure difference between the input chamber and the volumetric variable chamber.

In other words, the pressure difference between the input chamber and the volumetric variable chamber is information correctly imparting the brake pedal operating condition of the driver and the braking operating that the driver demands can be determined by detecting the pressure difference between the input chamber and the volumetric variable chamber on the basis of the values detected by the first and second pressure sensors.

Moreover, the values detected by the respective pressure sensors only need the process of calculating the difference without any differentiation and the noise added at the time the driver steps on the brake pedal is never amplified.

When an electric system failure occurs, further, the control unit keeps the electromagnetic valve for the sensor closed and also keeps the electromagnetic valve for the driving portion open so as to drive the brake unit hydraulically by supplying the hydraulic pressure generated by the master cylinder in response to the braking operation to the hydraulic driving portion of the brake unit.

DETAILED DESCRIPTION OF THE INVENTION

Preferred embodiments of a vehicle brake control system according to the present invention will now be described with reference to accompanying drawings.

Figure 1:
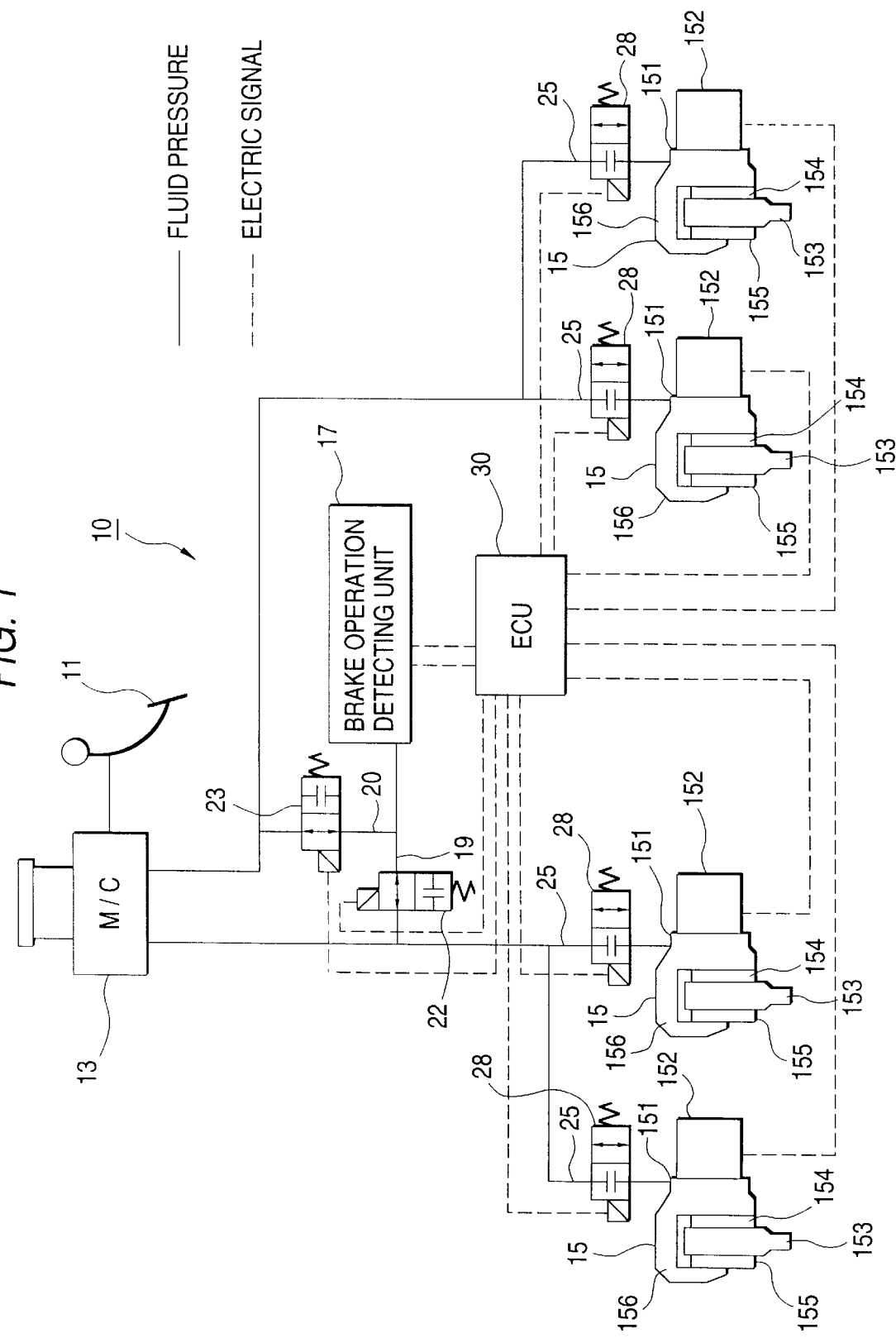
FIG. 1 is a schematic block diagram of a vehicle brake control system embodying the present invention.
Figure 2:
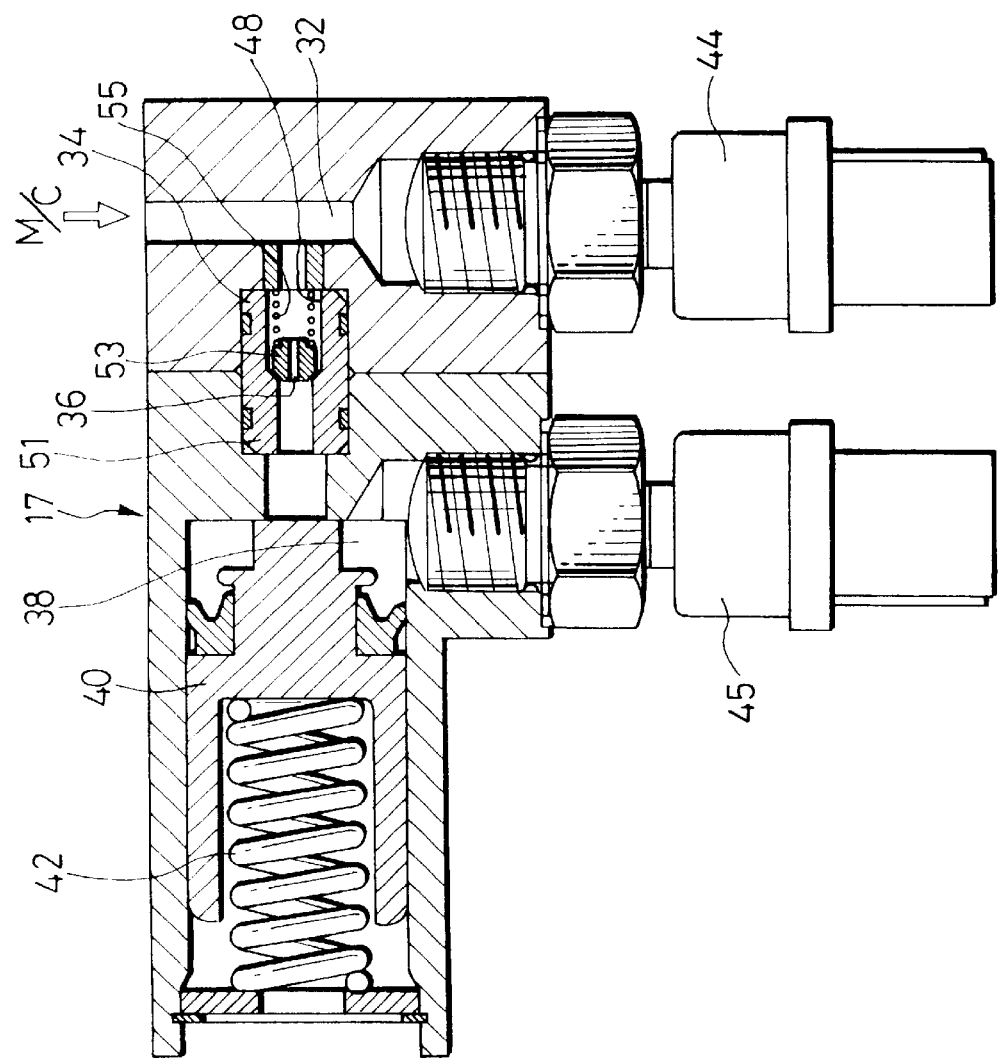
FIG. 2 is an enlarged sectional view of a brake-operation detecting unit in FIG. 1.
Figure 3:
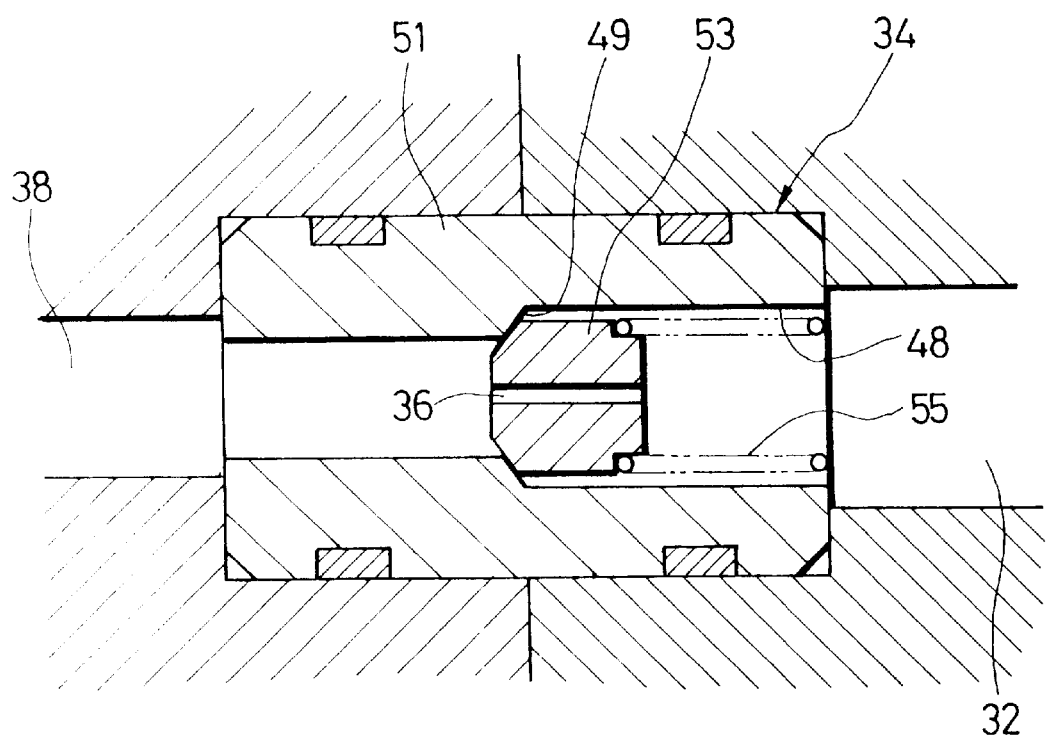
FIG. 3 is an enlarged sectional view of a one-way valve in the brake-operation detecting unit in FIG. 2.
Figure 4:
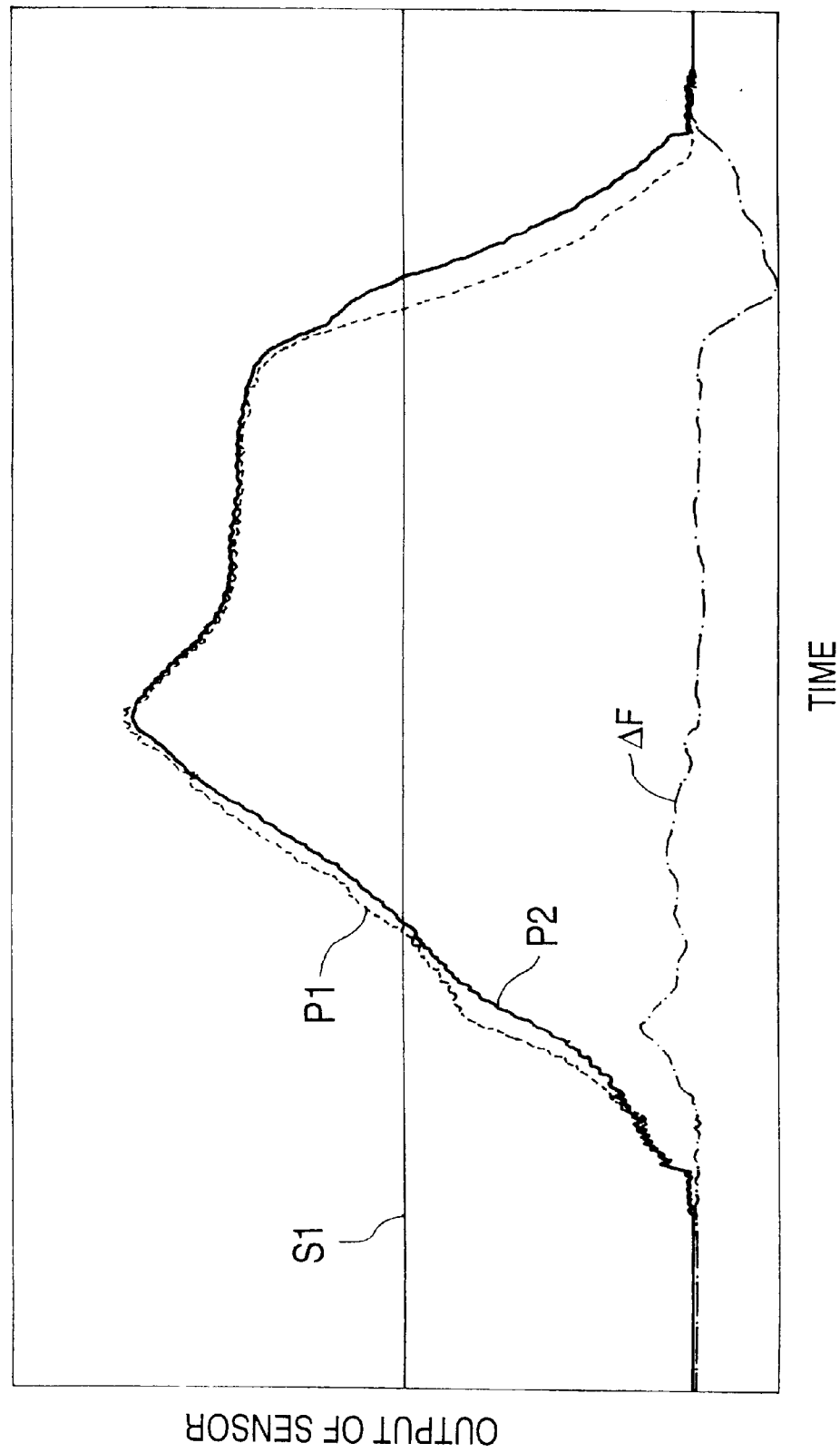
FIG. 4 is a graph showing outputs of a pressure sensor in the brake-operation detecting unit shown in FIG. 1 at the time of braking slowly.
Figure 5:
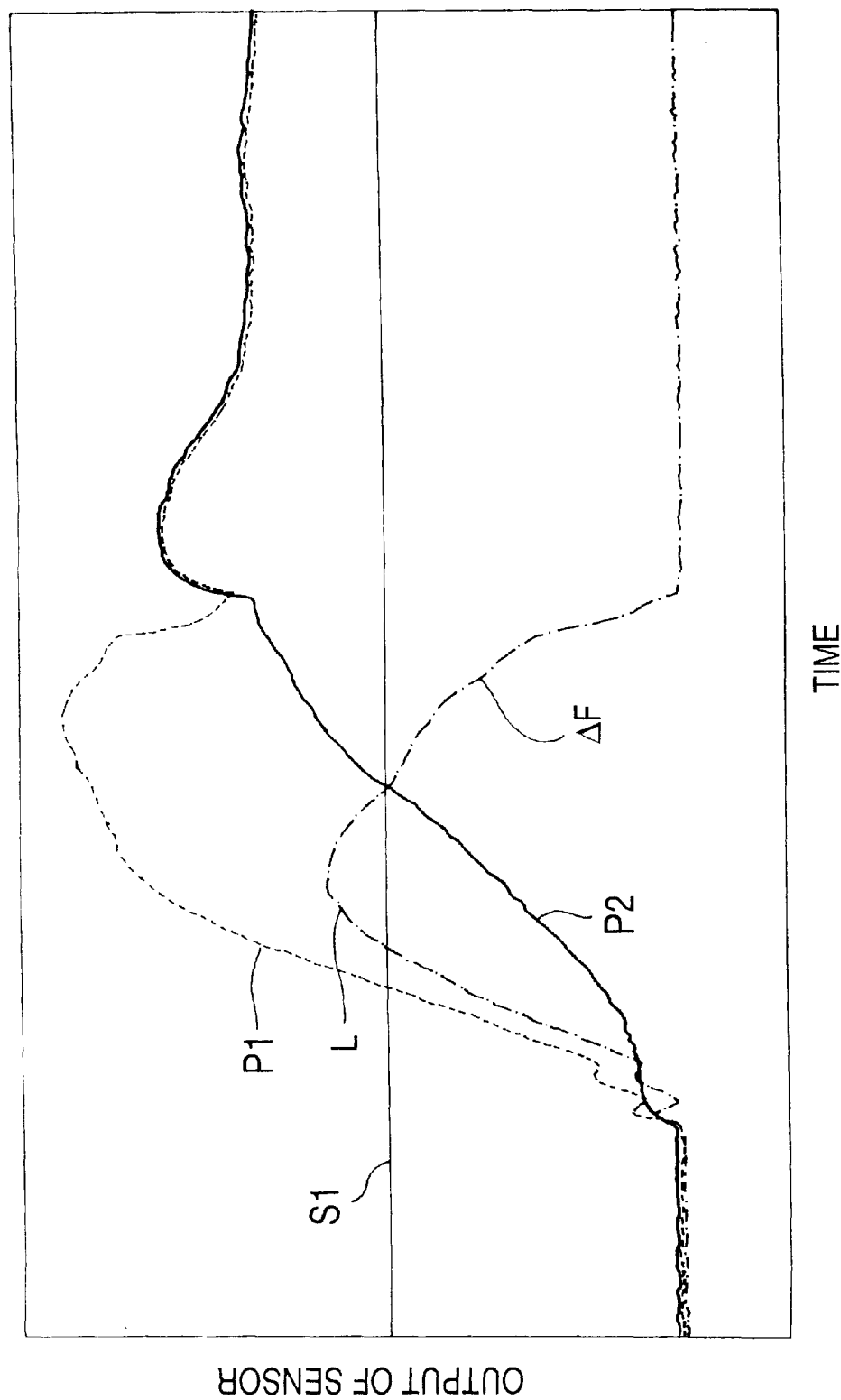
FIG. 5 is a graph showing outputs of the pressure sensor in the brake-operation detecting unit shown in FIG. 1 at the time of braking suddenly.
Figure 6:
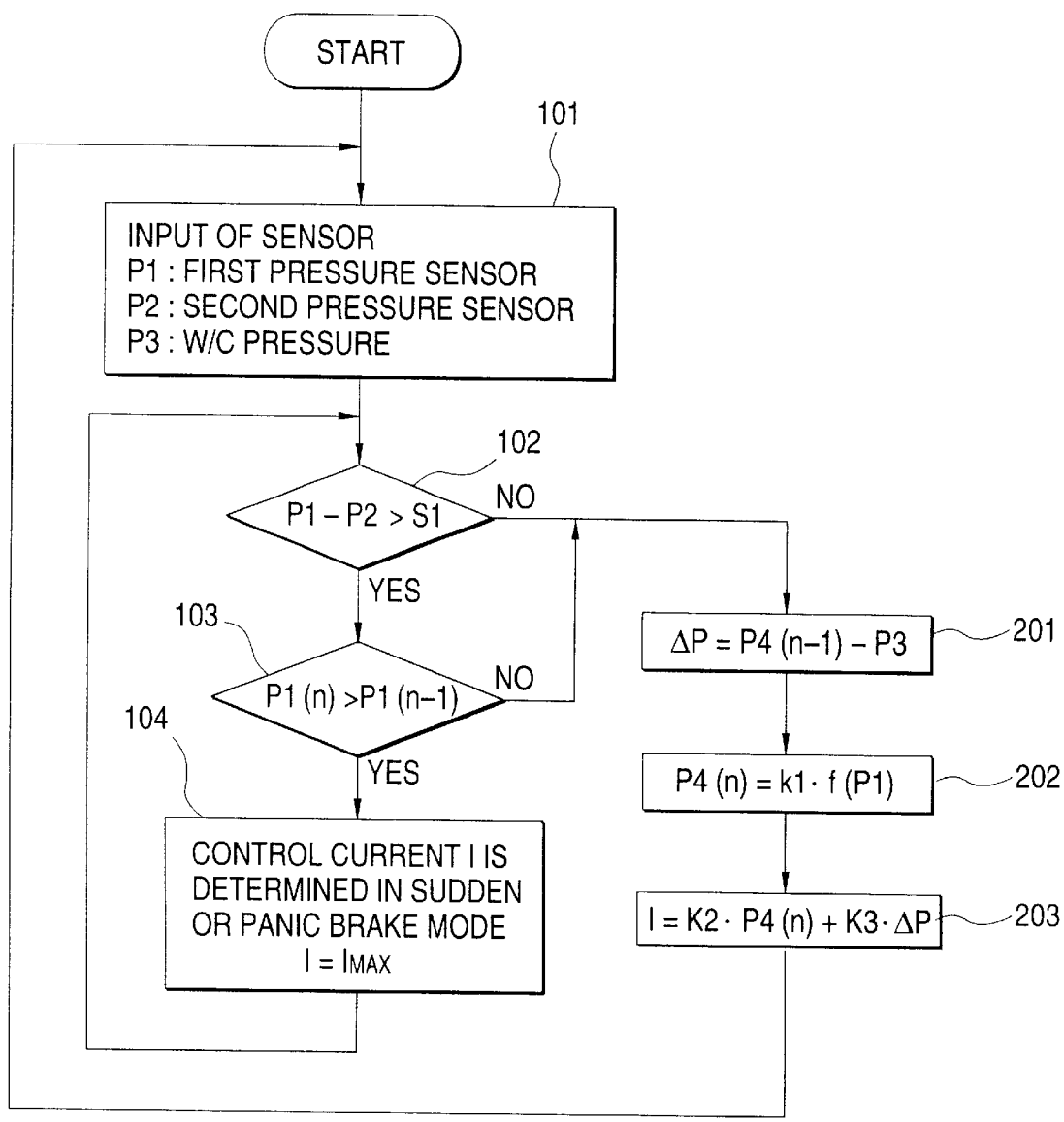
FIG. 6 is a flowchart showing a braking operation procedure in a control unit shown in FIG. 1.

FIGS. 1–7 show a vehicle brake control system according to a first embodiment of the invention: FIG. 1 is a schematic block diagram of a vehicle brake control system embodying the present invention; FIG. 2, an enlarged sectional view of a brake-operation detecting unit in FIG. 1; FIG. 3, an enlarged sectional view of a one-way valve in the brake-operation detecting unit in FIG. 2; FIG. 4, a graph showing outputs of pressure sensors in the brake-operation detecting unit shown in FIG. 1 at the time of braking slowly; FIG. 5, a graph showing outputs of the pressure sensors in the brake-operation detecting unit shown in FIG. 1 at the time of braking suddenly; FIG. 6 is a flowchart showing a braking operation procedure in a control unit shown in FIG. 1; and FIG. 7, a chart showing the correlation between the fluid pressure detected by the pressure sensor and a target fluid pressure for obtaining braking force corresponding the braking operation.

As shown in FIG. 1, a vehicle brake control system 10 according to a first embodiment of the invention comprises a master cylinder 13 for generating fluid pressure in response to the braking operation (stepping-on operation) performed on a brake pedal 11, a plurality of brake units 15 which are each equipped with fluid pressure driving portions 151 and electric actuators 152 as driving sources and actuated by the fluid pressure or electric power, a brake-operation detecting unit 17 for detecting a brake operating condition from the fluid pressure outputted from the master cylinder 13 and outputting signals corresponding to the brake operating condition, electromagnetic valves 22, 23, which are used for sensors, for opening and closing fluid passages 19, 20 for guiding the fluid pressure outputted from the master cylinder 13 to the brake-operation detecting unit 17, electromagnetic valves 28, which are used for driving portions, for opening and closing fluid passages 25 for guiding the fluid pressure outputted from the master cylinder 13 to the respective fluid pressure driving portions 151, and a control unit 30 for controlling the operations of the brake units 15, the electromagnetic valves 22, 23 used for sensors, and the electromagnetic valves 28 used for driving portions.

The brake pedal 11 is coupled to a piston in the master cylinder 13, so that fluid pressure corresponding to the stepping-on force applied to the pedal is outputted from the master cylinder 13.

The brake unit 15 according to this embodiment of the invention is a disc brake unit as made known by Japanese Patent Laid-Open Publication No. 60157/1993, for example, in which the piston in a caliper 156 for pressing frictional pads 154, 155 against a brake disc 153 is moved back and forth by the fluid pressure driving portion 151 or the electric actuator 152.

The electromagnetic valves 22, 23 are closed-type electromagnetic valves according to this embodiment of the invention and operate to close the fluid passages 19, 20 as shown in FIG. 1 at the time of an electric system failure.

The electromagnetic valves 28 are opened-type electromagnetic valves according to this embodiment of the invention and operate to close the fluid passages 25 as shown in FIG. 1 at the time of an electric system failure.

As shown in FIG. 2, the brake-operation detecting unit 17 comprises an input chamber 32 for introducing the fluid pressure in the master cylinder 13, a volumetric variable chamber 38 communicating with the input chamber 32 via an orifice 36 formed in a one-way valve 34, a piston 40 sliding in the volumetric variable chamber 38, a spring 42 for urging the piston in a direction in which the volume of the volumetric variable chamber 38 is reduced, and a first and a second pressure sensors 44, 45 for detecting the fluid pressure in the input chamber 32 and the volumetric variable chamber 38.

As shown in FIG. 3, the one-way valve 34 comprises a valve housing 51 for forming a communicating passage 48 used for communicating the input chamber 32 with the volumetric variable chamber 38 and equipped with a valve seat portion 49 on the way to the communicating passage 48 having a throttled diameter, and a valve body 53 slidable within the communicating passage 48 of a valve housing 51.

The valve body 53 is formed so that the orifice 36 is passed through the central portion of the valve body 53 and when the brake pedal 11 is stepped on at the time the fluid pressure in the master cylinder 13 is increased, the fluid pressure from the input chamber 32 causes the valve body 53 to be seated on the valve seat portion 49 so as to throttle the diameter of the orifice 36 in the communicating passage 48 and when the brake pedal 11 is released at the time the fluid pressure in the master cylinder 13 is decreased, the fluid pressure therefrom operates to release the communicating passage 48 from being throttled.

The valve body 53 is urged by a spring 55 for urging the valve body 53 toward the valve seat portion 49 so that the valve body 53 is kept being seated on the valve seat portion 49. The urging force of the spring 55 is properly set in such a manner that the fluid passage is opened when the driver releases his leg from the brake pedal 11 and when the fluid in the volumetric variable chamber 38 is returned to the input chamber 32 as the piston 40 is pressed by the spring 42 after the valve body 53 is quickly separated from the valve seat portion 49 by the pressure of the fluid returned from the volumetric variable chamber 38 to the input chamber 32.

While the normal operation of the electric system is maintained, the control unit 30 closes each of the electromagnetic valves 28 for the driving portions, keeps the electromagnetic valves for the sensors open, detects the brake operating condition on the basis of signals from the first and second pressure sensors 44, 45 of the brake-operation detecting unit 17, controls the operation of the electric actuators 152 of the brake units 15 in response to the brake operating condition, causes the brake units 15 to operate by increasing the fluid pressure in the wheel cylinders of the fluid pressure driving portions 151 so as to generate the braking force. In a case where there occurs an electric system failure resulting in obstructing the normal operation of the electric actuators 152, the control unit 30 closes the electromagnetic valve 22 for the sensor, simultaneously opens each of the electromagnetic valves 28 for the driving portions and introduces the output fluid pressure in the master cylinder 13 into the wheel cylinders of the fluid pressure driving portions 151, whereby to operate the brake units 15.

FIG. 4 is a graph resulting from sampling outputs Pi of the first pressure sensors 44 showing fluid pressure in the input chamber 32 of the brake-operation detecting unit 17 and outputs P2 of the second pressure sensor 45 showing fluid pressure of the volumetric variable chamber 38 and further the fluid pressure difference $\Delta F$ (=P1–P2) between the chambers in such a state that the normal brakes are applied.

FIG. 5 is a graph resulting from sampling outputs P1 of the first pressure sensors 44 showing fluid pressure in the input chamber 32 of the brake-operation detecting unit 17 and outputs P2 of the second pressure sensor 45 showing fluid pressure of the volumetric variable chamber 38 and further the fluid pressure difference $\Delta F$ (=P1–P2) between the chambers in such a state that the sudden or panic brakes are applied.

As is obvious from FIGS. 4, 5, the fluid pressure difference $\Delta F$ between the input chamber 32 and the volumetric variable chamber 38 of the brake-operation detecting unit 17 shows a substantially constant characteristic curve from the initial stage up to the terminal stage of the braking operation in the normal braking mode, whereas in the sudden braking mode, the fluid pressure difference $\Delta F$ therebetween shows a bulge L sharply rising at the initial stage of the braking operation but shows a constant characteristic curve at the terminal stage. The tendency like this is invariable even when a female driver having weak stepping-on strength applies the brakes.

Whether or not the fluid pressure difference $\Delta F$ has such a bulge L as sharply rises at the initial stage of the braking operation can be determined accurately from comparing the sizes of the fluid pressure difference $\Delta F$, that is, whether the fluid pressure difference $\Delta F$ exceeds a threshold value S1 by setting a suitable threshold value S1 beforehand.

Moreover, the process of calculating the fluid pressure difference $\Delta F$ and comparing the sizes of the fluid pressure difference $\Delta F$ and the threshold value S1 is not accompanied with any differentiating process but only with additions and subtractions and the noise added at the time the driver applies the brakes is never amplified.

On the basis of the aforesaid information, the control unit 30 according to this embodiment of the invention controls the operation of the electric actuators 152 by calculating the value of the current supplied to the electric actuators 152 through the steps shown in FIG. 6 at the time of the braking operation.

More specifically, each of the variables (P1, P2, etc.) in a memory is initialized when the program is started and as shown at Step 101, the control unit 30 fetches the fluid pressure P1 in the input chamber 32, the fluid pressure P2 in the volumetric variable chamber 38 that are outputted from the respective sensors 44, 45 and fluid pressure P3 in the wheel cylinders of the brake units 15 that is detected by fluid pressure sensors (not shown).

Subsequently, as shown at Step 102, the fluid pressure difference $\Delta F$ between the input chamber 32 and the volumetric variable chamber 38 is calculated from these pressure values in order to determine whether or not the fluid pressure difference $\Delta F$ thus calculated exceeds a preset threshold value S1.

When the fluid pressure difference $\Delta F$ does not exceed the threshold value S1, the brake operating condition given by the driver is determined to be normal and Step 201 is followed.

When the fluid pressure difference $\Delta F$ exceeds the threshold value S1, Step 103 is followed in order to determine whether or not fluid pressure P1 (n) in the input chamber 32 is greater than fluid pressure P1 (n–1) in the input chamber 32 set during the previous processing. When the fluid pressure set during the previous processing is greater, the fluid pressure in the input chamber 32 is decreasing and the braking operation that the driver demands is determined to be directed toward weakening the braking force and Step 201 is followed then as in the case where the fluid pressure difference ΔF does not exceed the threshold value S1.

At Steps 201–203, the control mode is switched to the normal braking mode and control current I to be supplied to the electric actuator 152 is set on the basis of the fluid pressure detected by the first pressure sensor 44 so that the braking force generated in the brake unit 15 corresponds to the fluid pressure in the master cylinder 13 which is introduced into the brake-operation detecting unit 17.

Figure 7:
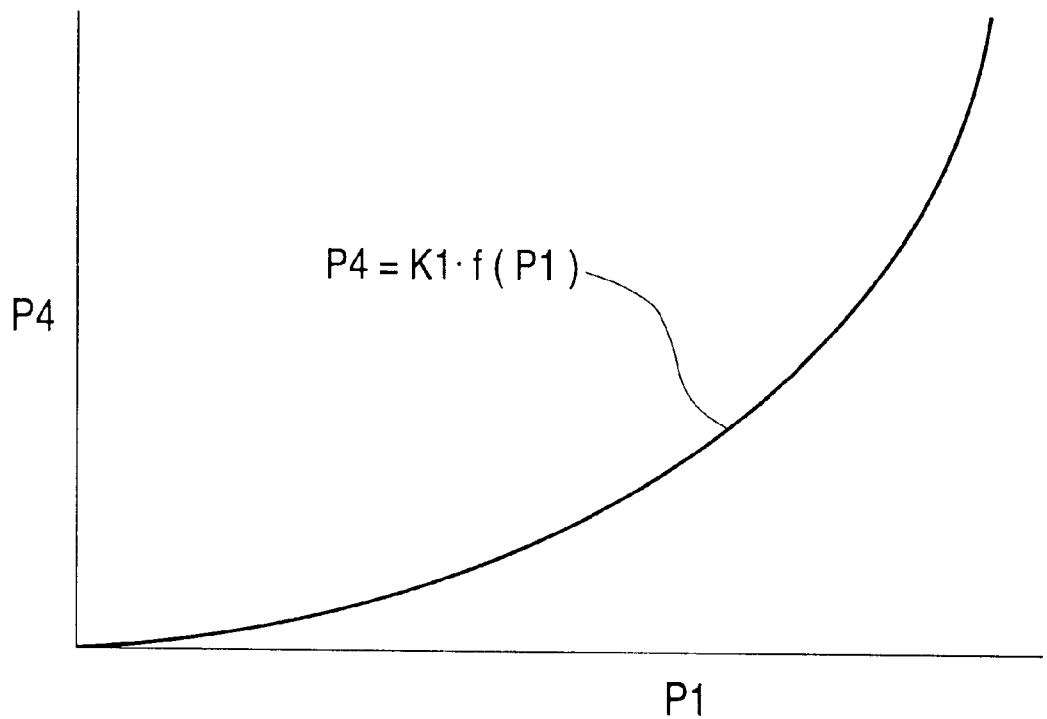
FIG. 7 is a chart showing the correlation between the fluid pressure detected by the pressure sensor and a target fluid pressure for obtaining braking force corresponding the braking operation.

More specifically, as shown in FIG. 7, an ideal target fluid pressure P4 expressed as a function of the fluid pressure P1 in the input chamber 32 detected by the first pressure sensor 44 is calculated. However, the difference ΔP between the target fluid pressure P4 (n−1) calculated during the previous processing and the fluid pressure P3 in the wheel cylinder detected during the processing this time in order that the braking force of the brake unit 15 may become the target fluid pressure P4 precisely at Step 201 before the ideal target fluid pressure P4 is calculated. Then control current I is controlled so that the difference ΔP is reduced.

In other words, the difference _P is obtained according to the following equation (1)

$$\Delta P = P4\ (n-1) - P3 \ldots \quad (1)$$

At Step 202, the target fluid pressure P4 is obtained according to the following equation (2)

$$P4\ (n) = k1 \cdot f(P) \ldots \quad (2)$$

where k1: correction coefficient.

At Step 203, further, the target fluid pressure thus corrected in consideration of the aforesaid difference ΔP is used to set the control current I for the target fluid pressure P4 calculated this time and the control current I is used to control the braking force repeatedly, whereby a slow braking state corresponding to the stepping-on operation can precisely be followed.

In this case, the control current I is expressed by the following equation (3)

$$I = k2 \cdot P4\ (n) + k3 \Delta P \ldots \quad (3)$$

Then Step 101 is followed again after current I to be supplied to the electric actuator 152 is set in such a manner that the fluid pressure in the wheel cylinder of the brake unit 15 corresponds to the target fluid pressure P4.

When the fluid pressure P1 (n) in the input chamber 32 this time is greater than the fluid pressure P1 (n−1) in the input chamber 32 fetched during the previous processing at Step 103, on the other hand, what the driver demands is determined to be a sudden or panic brake and Step 104 is followed since the fluid pressure difference ΔF is greater than the threshold value S1 and since the fluid pressure in the input chamber 32 is on the increase.

At Step 104, the control mode is switched to the sudden braking mode and the control current I supplied to the electric actuator 152 so as to set braking force generated by the brake unit 15 at $I_{MAX}$ for maximizing the braking force and Step 102 is followed again.

As set forth above, the brake-operation detecting unit 17 in the vehicle brake control system 10 causes the fluid pressure outputted from the master cylinder 13 in response to the braking operation to be accepted and absorbed by the input chamber 32 and the volumetric variable chamber 38 and simultaneously causes a suitable brake operating feeling to be produced by transmitting proper counterforce to the brake pedal 11 as a brake operating means by making use of the urging force of the spring 42 for urging the piston 40 in the volumetric variable chamber 38.

The control unit 30 for controlling the braking force generated by the brake unit 15 by controlling supply of electric power to the electric actuator 152 detects the fluid pressure difference ΔF between the input chamber 32 and the volumetric variable chamber 38 via the outputs from the first and second pressure sensors 44, 45 of the brake-operation detecting unit 17 so as to find precisely and quickly whether the brake applied by the driver is a normal or slow brake or otherwise a sudden or panic brake by comparing the sizes of the fluid pressure difference ΔF and the predetermined threshold value S1.

In order to control supply of electric power to the electric actuator 152 by switching between the control modes in response to the brake operating condition thus detected, the motor-driven brake unit 15 is adapted to operate properly at high response speed as the driver demands.

Moreover, supply of electric power to the electric actuator 152 is controlled so as to maximize braking force to be generated at the time of braking suddenly wherein the fluid pressure difference ΔF exceeds the threshold value S1. Consequently, sufficient and necessary braking force compensating for the shortage of brake operating force can properly be generated even in the case of a female driver having weak pedal stepping-on strength, for example, whereby trouble originating from shortage of operating force is made preventable.

At the time of braking slowly wherein the fluid pressure difference ΔF does not exceed the threshold value S1, the brake operating force of the driver is used to control the control current directed to the electric actuator 152 by, for example, setting target fluid pressure according to the output signal of the first pressure sensor 44, correcting the target fluid pressure to decrease the pressure difference between the target fluid pressure during the previous processing and actual fluid pressure on the wheel cylinder, so that the corrected target fluid pressure is available. Accordingly, suitable braking force proportional to the brake operating force can be generated efficiently as in the case of directly operating of the brake unit with the fluid pressure outputted from the master cylinder 13.

In the control unit 30, the electromagnetic valve 22 for the sensor is closed and the electromagnetic valve 28 for the driving portion is opened at the time of an electric system failure, whereby to drive the brake unit with fluid pressure by supplying the fluid pressure generated by the master cylinder 13 in response to the brake operation to the fluid pressure driving portion 151 of the brake unit 15.

Consequently, the proper operation of the brake unit 15 in response to the brake operation can be secured even at the time of such an electric system failure with the effect of improving the reliability and safety of the brake operation.

At the time of braking suddenly wherein the fluid pressure difference ΔF exceeds the threshold value S1 according to the aforesaid embodiment of the invention, the control current I supplied to the electric actuator 152 is set at $I_{MAX}$ so as to maximize the braking force generated by the brake unit 15. However, the control current supplied to the electric actuator 152 has the effect of compensating for the shortage of operating force as long as the control current is greater than what is supplied at the time of braking slowly. Consequently, the control current supplied to the electric actuator 152 at the time of braking suddenly wherein the fluid pressure difference ΔF exceeds the threshold value S1 need not necessarily be set at $I_{MAX}$ but may be set at a proper value greater than that of the control current supplied at the time of braking slowly.

At the time of braking slowly wherein control current is set to the electric actuator 152 with the normal braking mode as the control mode, the target fluid pressure P4 has been calculated with the fluid pressure P1 in the input chamber 32 as a reference detected from the output signal of the first pressure sensor 44 according to the aforesaid embodiment of the invention. However, as shown in FIG. 4, the same effect is obtainable by calculating the target fluid pressure P4 with the fluid pressure P2 in the volumetric variable chamber 38 as a reference in place of the fluid pressure P1 in the input chamber 32 since the fluid pressure P1 in the input chamber 32 is substantially equal to the fluid pressure P2 in the volumetric variable chamber 38 at the time of braking slowly.

A detailed description will subsequently be given of a vehicle brake control system as a second embodiment of the invention with reference to FIGS. 8, 9. As the configuration of a brake control system in the second embodiment of the invention is similar to that of the brake control system in the first embodiment thereof, the former control system will be described with reference to FIG. 1, too.

Figure 8:
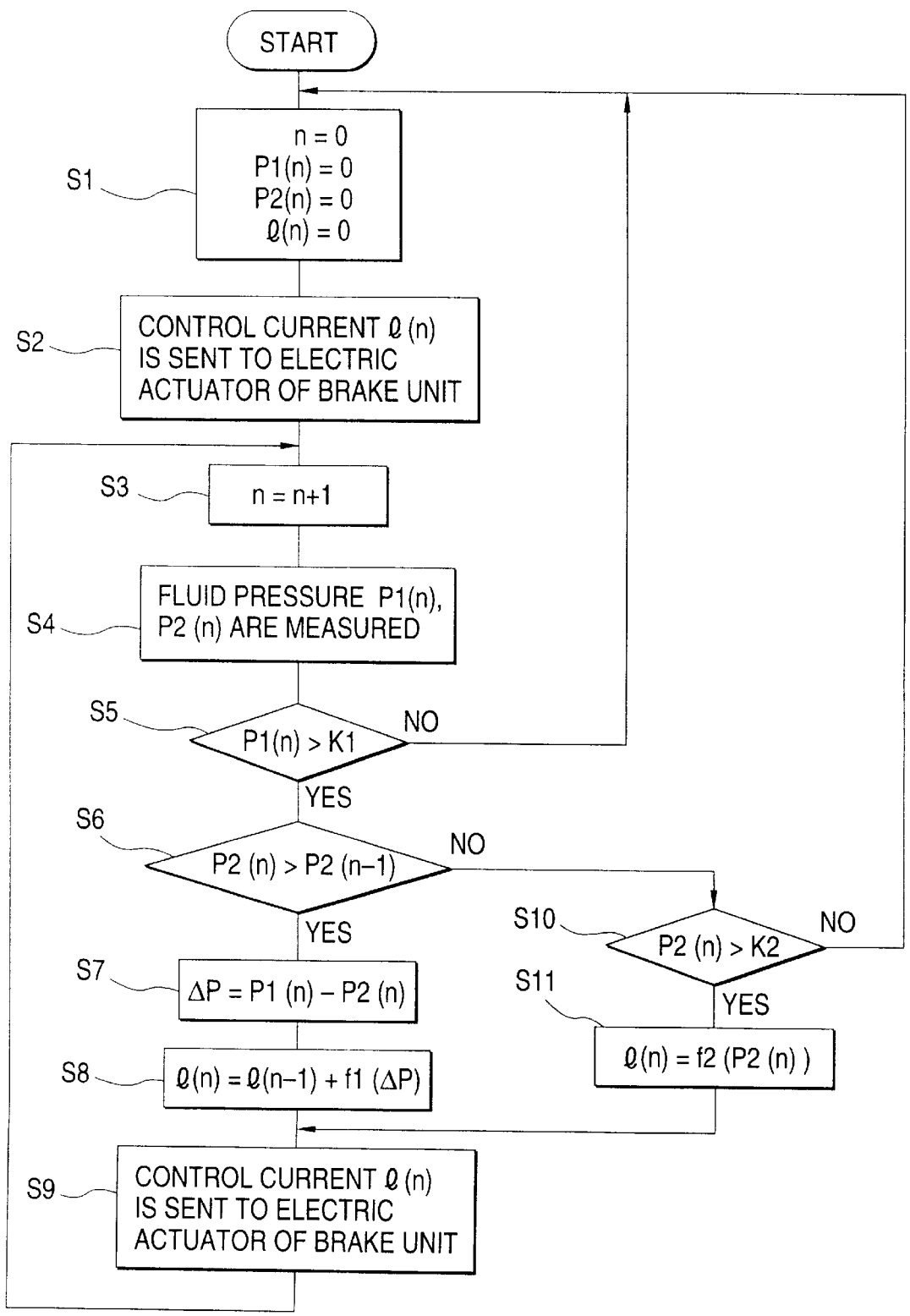
FIG. 8 is a flowchart showing a braking operation procedure in the control unit shown in FIG. 1.

The control unit 30 makes the electric actuator 152 of the brake unit 15 operate through the steps shown in FIG. 8.

More specifically, each of the variables n, P1 (n), P2 (n) and 1 (n) is initialized at Step S1. The control current 1 (n) thus initialized is sent to the electric actuator 152 of the brake unit 15 Step S2. At Step S3, 1 is added to a counter variable n. At Step S4, fluid pressure P1 (n) in the input chamber 32 and fluid pressure P2 (n) in the volumetric variable chamber 38 are respectively measured by the first and second pressure sensors 44, 45.

At Step S5, further, whether or not the fluid pressure P1 (n) in the input chamber 32 exceeds a threshold value K1 is determined and when the fluid pressure P1 (n) does not exceed the threshold value K1, Step S1 is followed again. When the fluid pressure P1 (n) exceeds the threshold value K1, it is determined that stepping-on the brake pedal 11 has been started and Step S6 is followed.

At Step S6, it is determined whether or not the fluid pressure P2 (n) in the volumetric variable chamber 38 measured this time is greater than the fluid pressure P2 (n−1) therein measured previously and if P2 (n)>P2 (n−1), the brake pedal 11 is determined to have been stepped on and Step S7 is followed. At Step S7, the pressured difference ΔP between the fluid pressure P1 (n) in the input chamber 32 and the fluid pressure P2 (n) in the volumetric variable chamber 38 is calculated.

At Step S8, a corrected current value f1 (ΔP) proportional to the pressure difference ΔP is added to the previous control current value 1 (n−1) so as to calculate the control current value 1 (n) this time. At Step S9, the control current value 1 (n) is supplied to the electric actuator 152 of the brake unit 15 and braking force proportional the control current value 1 (n) is generated.

Thereafter, Step S3 is followed again and a corrected current value f1 (ΔP) proportional to the pressure difference ΔP is obtained, whereby control is exerted over slow braking up to panic braking with excellent responsivity.

When the fluid pressure P2 (n) this time in the volumetric variable chamber 38 becomes lower than the previous fluid pressure P2 (n−1), it is determined that the brake pedal 11 is being released and a No decision is made at Step S6 and Step S10 is followed.

At Step S10, the fluid pressure P2 (n) in the volumetric variable chamber 38 is compared with a threshold value K2 and if it is greater than the threshold value K2, a control current value 1 (n)=f2 (P2 (n)) proportional to the fluid pressure P2 (n) is calculated at Step S11 and the calculated result is supplied to the electric actuator 152 of the brake unit 15 at Step S9.

If a No decision is made at Step S10, the brake pedal 11 is determined to have completely been released and Step S1 is followed again.

As set forth above, the control unit 30 in the vehicle brake control system 10 according to this embodiment of the invention keeps the electromagnetic valve 28 for the driving portion closed and keeps the electromagnetic valves 22, 23 for the sensors opened while an electric system is normal, causes the hydraulic pressure generated by the master cylinder 13 to be accepted by the brake-operation detecting unit 17 and controls the operation of the electric actuator 152 of the brake unit 15 according to the signal outputted from the brake-operation detecting unit 17, whereby to make the brake unit 15 perform a predetermined braking operation.

In this case, the brake-operation detecting unit 17 causes the fluid pressure outputted from the master cylinder 13 in response to the braking operation to be accepted and absorbed by the input chamber 32 and the volumetric variable chamber 38 and simultaneously causes a suitable brake operating feeling to be produced by transmitting proper counterforce to the brake pedal as a brake operating means by making use of the urging force of the spring 42 for urging the piston 40 in the volumetric variable chamber 38.

In the brake-operation detecting unit 17, moreover, the pressurized fluid in the input chamber 32 flows into the volumetric variable chamber 38 via the orifice 36 since the fluid is slowly pressurized in the input chamber 32 because of the introduction of the fluid pressure in the master cylinder 13 at the time of braking slowly wherein the brake pedal is slowly stepped on and not so much pressure difference is produced between the input chamber 32 and the volumetric variable chamber 38.

At the time of braking suddenly wherein the brake pedal suddenly stepped on, on the other hand, the passage of the orifice 36 occurs too late since the fluid is quickly pressurized in the input chamber 32 because of the introduction of the fluid pressure in the master cylinder 13 and the fluid pressure in the input chamber 32 greatly rises, whereas the fluid pressure in the volumetric variable chamber 38 slightly rises, thus resulting in producing the pressure difference between the input chamber 32 and the volumetric variable chamber 38.

Figure 9:
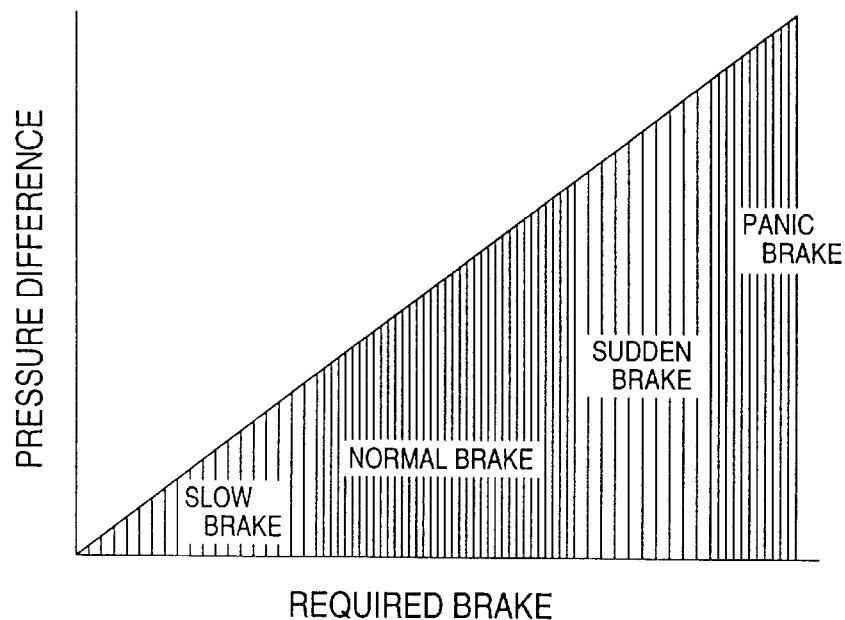
FIG. 9 is a chart showing the correlation between the detected pressure different and the braking operation that a driver demands in the brake-operation detecting unit shown in FIG. 1.
Figure 10:
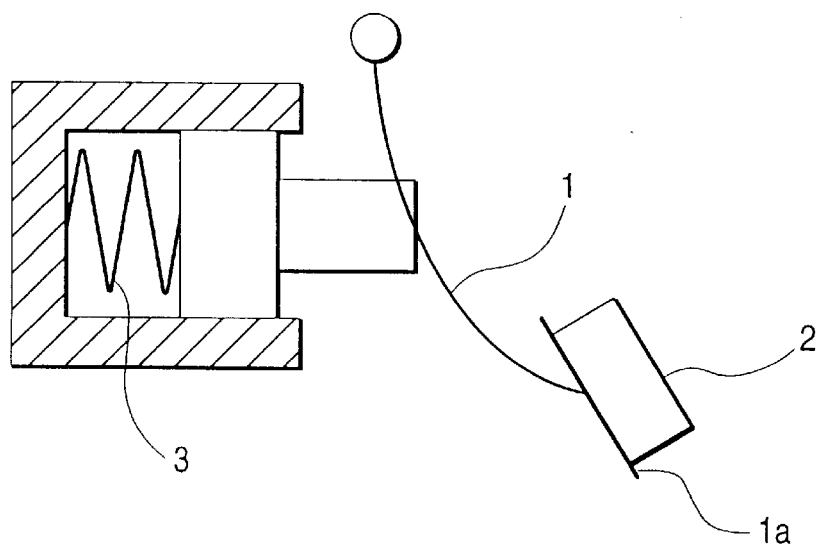
FIG. 10 is a schematic block diagram of a conventional brake-operation detecting unit.
Figure 11:
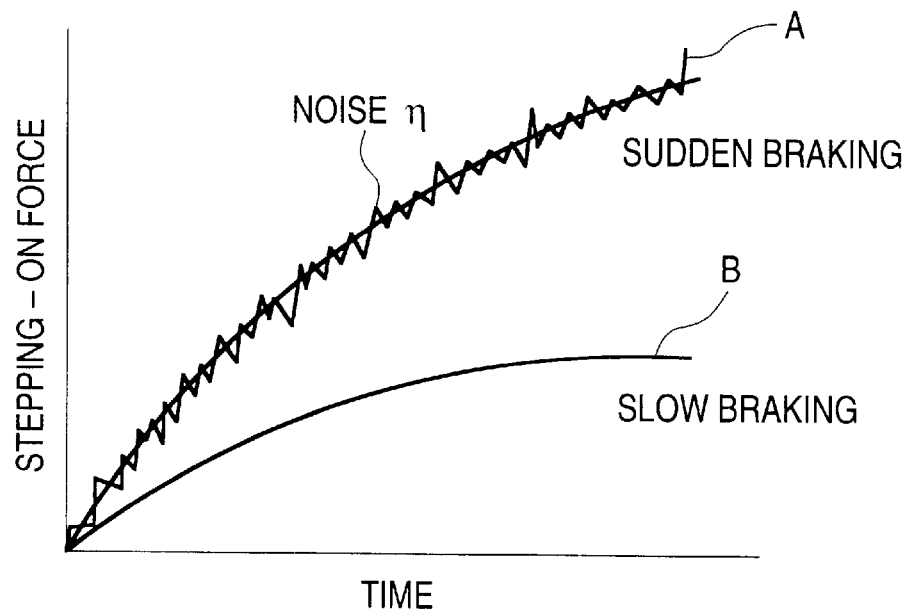
FIG. 11 is a characteristic diagram showing the difference between stepping-on force acting on a brake pedal at the time of braking suddenly and what acts thereon at the time of braking slowly.
Figure 12:
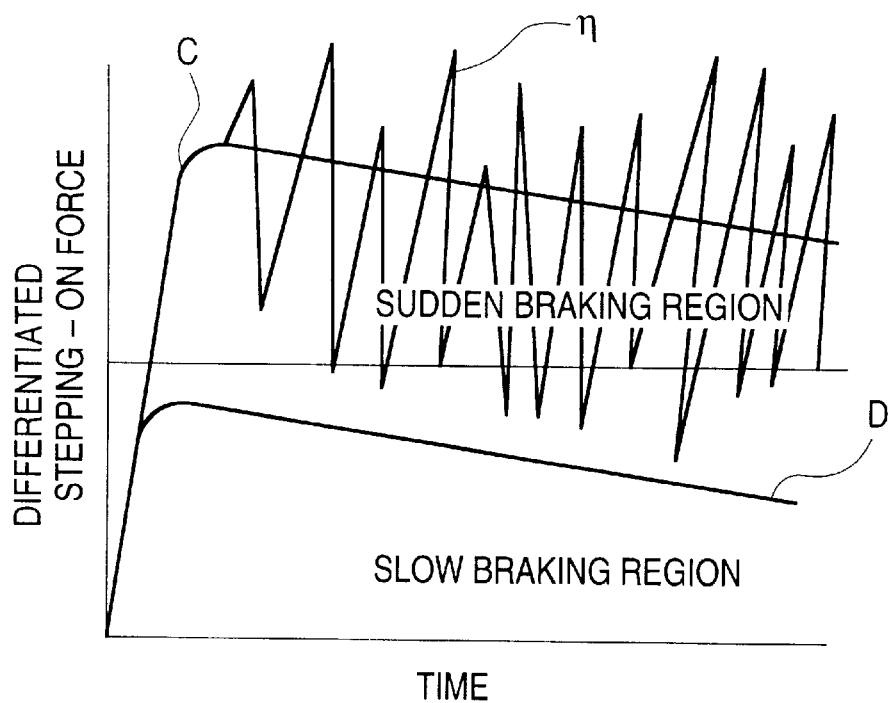
FIG. 12 is a diagram illustrating differential values of the stepping-on force shown in FIG. 11.

In other words, the pressure difference ΔP between the input chamber 32 and the volumetric variable chamber 38 is information correctly imparting the brake pedal operating condition of the driver and as shown in FIG. 9, braking slowly, normally, suddenly and in panic correspond to the order in which the pressure difference ΔP lowers; the braking operation that the drivers demands can thus be determined by detecting the pressure difference ΔP between the input chamber 32 and the volumetric variable chamber 38 on the basis of the values detected by the first and second pressure sensors 44, 45.

Furthermore, the values detected by the pressure sensors 44, 45 need not be subjected to any differentiating process but to calculation for simply finding the difference therebetween and consequently the noise added at the time of operating the brake pedal by the driver is never amplified.

Therefore, no filtering process for removing noise is needed and the detecting process is prevented from being delayed because of the filtering process. The brake operating condition is precisely and quickly detected, so that the motor-driven brake unit can be operated properly with excellent responsivity.

In addition, the one-way valve 34 is installed between the input chamber 32 and the volumetric variable chamber 38 and besides the orifice 36 for communicating the input chamber 32 and the volumetric variable chamber 38 with each other is mounted in the valve body 53 of the one-way valve 34 according to this embodiment of the invention, so that the brake pedal 11 is quickly restored to the initial position as the communicating passage 48 greater in diameter than the orifice 36 makes the input chamber 32 communicate with the volumetric variable chamber 38 when the brake pedal 11 is released from being stepped on, thus accelerating the return of the fluid caused to flow from the input chamber 32 into the volumetric variable chamber 38.

The brake-operation detecting unit in the vehicle brake control system according to the present invention causes the fluid pressure outputted from the master cylinder in response to the braking operation to be accepted and absorbed by the input chamber and the volumetric variable chamber and simultaneously causes a suitable brake operating feeling to be produced by transmitting proper counterforce to the brake pedal as a brake operating means by making use of the urging force of the spring for urging the piston in the volumetric variable chamber.

The fluid pressure difference between the input chamber and the volumetric variable chamber shows a substantially constant characteristic curve from the initial stage up to the terminal stage of the braking operation at the time of braking slowly in the normal braking mode, whereas at the time of braking suddenly in the sudden or panic braking mode, the fluid pressure difference therebetween shows a bulge sharply rising at the initial stage of the braking operation but shows a constant characteristic curve at the terminal stage. This tendency is invariable even when a female driver having weak stepping-on strength applies the brakes. Whether or not the fluid pressure difference has such a bulge as sharply rises at the initial stage of the braking operation can be determined accurately from comparing the sizes of the fluid pressure difference, that is, whether the fluid pressure difference exceeds the threshold value by setting a suitable threshold value beforehand. Moreover, the process of calculating the fluid pressure difference and comparing the sizes of the fluid pressure difference and the threshold value is not accompanied with any differentiating process but only with additions and subtractions and the noise added at the time the driver applies the brakes in the prior art is never amplified.

Therefore, it is possible to detect correctly and quickly at the initial stage where the braking operation is started whether the braking operation designates, for example, slow braking such as normal braking, sudden or panic braking by comparing the sizes of the pressure difference and the predetermined threshold value. Then each electrically-driven brake unit can be actuated properly with excellent responsivity as the driver demands by controlling supply of electric power to the electric actuator according to the output signal of the first or second pressure sensor as a parameter indicative of the intensity of the braking operating force of the driver.

Since supply of electric power to the electric actuator is controlled so as to maximize braking force to be generated at the time of braking suddenly in the sudden or panic braking mode wherein the fluid pressure difference exceeds the threshold value. Consequently, sufficient and necessary braking force compensating for the shortage of brake operating force can properly be generated even in the case of a female driver having weak pedal stepping-on strength, for example, whereby trouble originating from shortage of operating force is made preventable.

Furthermore, the values detected by the first and second pressure sensors are substantially equal to each other in the normal braking mode wherein the pressure difference does not exceed the threshold value and either of them varies with the fluid pressure generated in response to the braking operation and is usable as a parameter accurately representing the intensity of the brake operating force. Consequently, the control unit switches the control mode to the normal braking mode when the pressure difference does not exceed the threshold value and controls supply of electric power to the electric actuator on the basis of the fluid pressure detected by the first or second pressure sensor so that the braking force generated by the brake unit conforms to a value corresponding to the fluid pressure in the master cylinder introduced into the brake-operation detecting unit. Then proper braking force corresponding to the brake operating force can be generated as in the case of directly actuating the brake unit with the fluid pressure outputted from the master cylinder in the normal braking mode wherein the pressure difference does not exceed the threshold value.

As set forth above, the control unit in the brake-operation detecting unit according to the present invention keeps the electromagnetic valve for the driving portion, also keeps the electromagnetic valve for the sensor when the electric system is normal, causes the hydraulic pressure generated by the master cylinder to be accepted by the brake-operation detecting unit and controls the operation of the electric actuator of the brake unit according to the signal outputted from the brake-operation detecting unit, whereby to make the brake unit perform the predetermined operation.

In the brake-operation detecting unit, moreover, the pressurized fluid in the input chamber flows into the volumetric variable chamber via the orifice since the fluid is slowly pressurized in the input chamber because of the introduction of the fluid pressure in the master cylinder at the time of braking slowly wherein the brake pedal is slowly stepped on and not so much pressure difference is produced between the input chamber and the volumetric variable chamber.

At the time of braking suddenly wherein the brake pedal is stepped on suddenly, on the other hand, the passage of the orifice is delayed since the fluid in the input chamber is suddenly pressurized because of the introduction of the fluid pressure in the master cylinder and the fluid pressure in the volumetric variable chamber slightly rises, whereas the fluid pressure in the input chamber rises greatly, thus resulting in producing great pressure difference between the input chamber and the volumetric variable chamber.

In other words, the pressure difference between the input chamber and the volumetric variable chamber is information correctly imparting the brake pedal operating condition of the driver and the braking operation that the drivers demands can thus be determined by detecting the pressure difference between the input chamber and the volumetric variable chamber on the basis of the values detected by the first and second pressure sensors.

Therefore, no filtering process for removing noise is needed and the detecting process is prevented from being delayed because of the filtering process. The brake operating condition is precisely and quickly detected, so that the motor-driven brake unit can be operated properly with excellent responsivity.

When the electric system failure occurs, further, the control unit keeps the electromagnetic valve for the sensor closed and also keeps the electromagnetic valve for the driving portion open so as to drive the brake unit hydraulically by supplying the hydraulic pressure generated by the master cylinder in response to the braking operation to the hydraulic driving portion of the brake unit.

Consequently, the proper operation of the brake unit in response to the brake operation can be secured even at the time of such an electric system failure with the effect of improving the reliability and safety of the brake operation.

What is claimed is:

1. A vehicle brake control system comprising: a master cylinder for generating fluid pressure in response to a braking operation, brake units respectively actuated by electric actuators, a brake-operation detecting unit for detecting a brake operating condition from the fluid pressure outputted from the master cylinder and outputting a signal corresponding to the brake operating condition, and a control unit for controlling the braking force outputted from each brake unit by actuating the electric actuator according to the output signal of the brake-operation detecting unit, wherein the brake-operation detecting unit having an input chamber into which the fluid pressure in the master cylinder is introduced, a volumetric variable chamber communicating with the input chamber via an orifice, a piston sliding in the volumetric variable chamber, a spring for urging the piston in the direction of reducing the volume of the volumetric variable chamber, a first and a second pressure sensor for respectively detecting the fluid pressure in the input chamber and the fluid pressure in the volumetric variable chamber, and wherein the control unit being used for switching between control modes according to a pressure difference between the input chamber and the volumetric variable chamber as calculated on the basis of the output signals of the first and second pressure sensors, switching the control mode to a sudden braking mode when the pressure difference exceeds a predetermined threshold value so as to compare the sudden braking mode with the control mode at the time the fluid pressure does not exceed the threshold value, and controlling supply of electric power to each electric actuator so that the braking force generated by the brake unit is increased.

2. A vehicle brake control system as claimed in claim 1, wherein the control unit switches the control mode to a normal braking mode when the pressure difference does not exceed the threshold value and controls supply of electric power to each electric actuator on the basis of the fluid pressure detected by one of the first and second pressure sensors so that the braking force generated by the brake unit corresponds to the fluid pressure introduced from the master cylinder into the brake-operation detecting unit.

3. A vehicle brake control system comprising:

a master cylinder for generating fluid pressure in response to a braking operation, hydraulically- and electrically-driven brake units respectively equipped with oil-hydraulic driving portions as driving sources and electric actuators, and a brake-operation detecting unit for detecting a brake operating condition from the fluid pressure outputted from the master cylinder and outputting a signal corresponding to the brake operating condition, electromagnetic valves for sensors, the electromagnetic valves for the sensors being used for respectively opening and closing hydraulic passages for use in introducing the hydraulic pressure outputted from the master cylinder, and electromagnetic valves for the driving portions, the electromagnetic valves for the driving portions being used for respectively opening and closing hydraulic passages for use in introducing the hydraulic pressure outputted from the master cylinder, and a control unit for controlling the operation of the brake units, the electromagnetic valves for the sensors and the electromagnetic valves for the driving portions, wherein the brake-operation detecting unit having an input chamber into which the fluid pressure in the master cylinder is introduced, a volumetric variable chamber communicating with the input chamber via an orifice, a piston sliding in the volumetric variable chamber, a spring for urging the piston in the direction of reducing the volume of the volumetric variable chamber, a first and a second pressure sensor for respectively detecting the fluid pressure in the input chamber and the fluid pressure in the volumetric variable chamber, and wherein the control unit being used for controlling the electric actuators on receiving signals from the first and second pressure sensors.

* * * * *